(12) United States Patent
Lauby et al.

(10) Patent No.: US 9,971,729 B2
(45) Date of Patent: May 15, 2018

(54) POWER-OVER-ETHERNET POWERED UNIVERSAL SERIAL BUS CHARGING PORT

(71) Applicant: Leviton Manufacturing Co., Inc., Melville, NY (US)

(72) Inventors: William J. Lauby, Mukilteo, WA (US); Ryan Moore, Seattle, WA (US); Dean S. Lipke, Mill Creek, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days. days.

(21) Appl. No.: 14/513,005

(22) Filed: Oct. 13, 2014

(65) Prior Publication Data

US 2015/0106536 A1    Apr. 16, 2015

Related U.S. Application Data

(60) Provisional application No. 61/891,827, filed on Oct. 16, 2013.

(51) Int. Cl.

| | |
|---|---|
| *G06F 3/00* | (2006.01) |
| *G06F 13/20* | (2006.01) |
| *G06F 13/36* | (2006.01) |
| *H02M 7/00* | (2006.01) |
| *H04B 3/00* | (2006.01) |
| *G06F 13/42* | (2006.01) |
| *H04L 12/10* | (2006.01) |

(52) U.S. Cl.
CPC .......... *G06F 13/4221* (2013.01); *H04L 12/10* (2013.01)

(58) Field of Classification Search
CPC ............... G06F 13/4221; G06F 13/387; G06F 13/4027; H04L 12/10; H04L 12/413; H04B 3/54
USPC ...... 710/8, 313, 11, 14, 16, 315; 363/15, 13; 375/257; 370/401
See application file for complete search history.

(56) References Cited

U.S. PATENT DOCUMENTS

| | | | | |
|---|---|---|---|---|
| 7,664,972 | B2 * | 2/2010 | Diab | H04L 12/10 709/200 |
| 7,701,092 | B1 * | 4/2010 | Parker | H04L 12/10 307/154 |
| 8,300,679 | B2 * | 10/2012 | Mezer | H04B 1/10 375/219 |
| 8,676,261 | B2 * | 3/2014 | Hermansson | H04W 88/08 455/128 |
| 2003/0122551 | A1 * | 7/2003 | Male | G01R 27/02 324/607 |

(Continued)

*Primary Examiner* — Farley Abad
*Assistant Examiner* — Henry W Yu
(74) *Attorney, Agent, or Firm* — Amin, Turocy & Watson, LLP

(57) ABSTRACT

A power conversion device is configured to convert power-over-Ethernet (PoE) power to universal serial bus (USB) power to yield a USB charging port. The conversion device can conform to a number of modular and/or portable form factors, allowing existing Ethernet data ports to be easily converted to USB charging ports. Embodiments include a modular conversion device configured to mount in a window of an existing wall plate as a replacement for an unused Ethernet data port, and a portable conversion device that can be plugged into an existing Ethernet data port. The conversion device receives PoE power from the Ethernet network, converts the PoE power to an appropriate USB standard, and delivers the power to an integrated USB charging port.

20 Claims, 17 Drawing Sheets

(56) References Cited

U.S. PATENT DOCUMENTS

| | | | |
|---|---|---|---|
| 2003/0169157 A1* | 9/2003 | Yokoo | H04B 3/54 375/257 |
| 2004/0136384 A1* | 7/2004 | Cho | H04L 12/4625 370/401 |
| 2006/0046575 A1* | 3/2006 | Allen | H01R 33/97 439/638 |
| 2006/0109728 A1* | 5/2006 | Dwelley | G06F 1/266 365/222 |
| 2008/0151443 A1 | 6/2008 | Lee et al. | |
| 2009/0196621 A1* | 8/2009 | Chen | G06F 13/4027 398/115 |
| 2010/0030999 A1 | 2/2010 | Hinz | |
| 2010/0171626 A1* | 7/2010 | Darshan | H04L 12/10 340/660 |
| 2010/0237840 A1* | 9/2010 | Walter | H02J 7/0068 323/282 |
| 2011/0219147 A1* | 9/2011 | Diab | G06F 12/00 710/8 |
| 2012/0191894 A1* | 7/2012 | Sasaki | G06F 13/387 710/313 |
| 2013/0301301 A1* | 11/2013 | Fischer | H04L 12/413 363/15 |
| 2014/0195831 A1* | 7/2014 | Hamdi | G06F 1/3296 713/320 |

\* cited by examiner

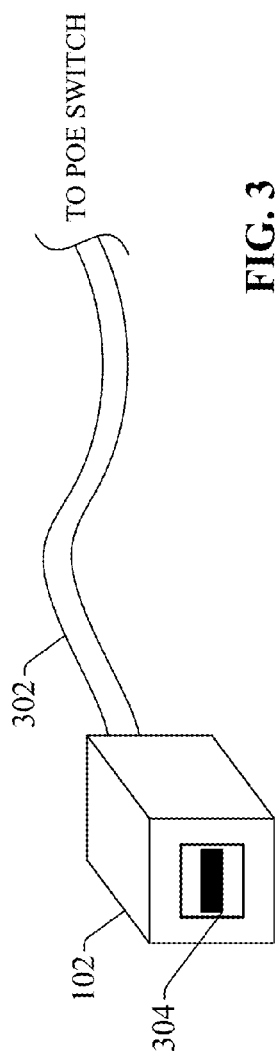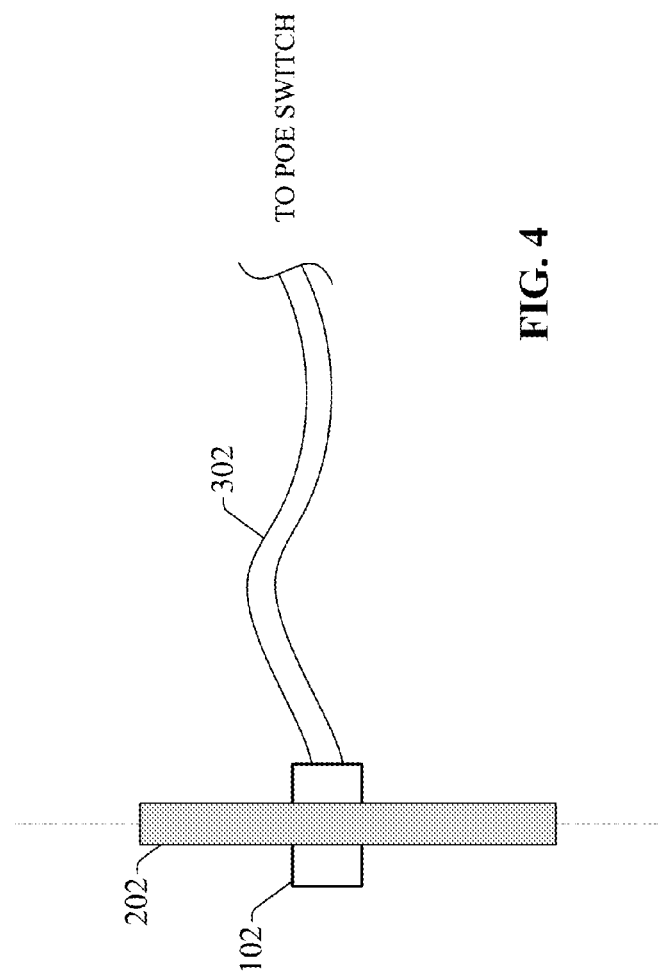

POWER-OVER-ETHERNET POWERED UNIVERSAL SERIAL BUS CHARGING PORT

CROSS-REFERENCE TO RELATED APPLICATIONS

This application claims priority to U.S. Provisional Application Ser. No. 61/891,827, filed on Oct. 16, 2013, and entitled "POWER-OVER-ETHERNET POWERED UNIVERSAL SERIAL BUS CHARGING PORT," the entirety of which is incorporated by reference.

TECHNICAL FIELD

The disclosed subject matter relates generally to universal serial bus (USB) charging ports, and, for example, to modular or portable devices that convert power-over-Ethernet to USB power for charging of electronic devices

BACKGROUND

Prior to the emergence of wireless networks, users wishing to access the Internet from a public location—e.g., a library, an airport, a hospital waiting room, a classroom, etc.—or from their home were required to locate and connect to a physical data port, typically an RJ45 Ethernet port. The growth of wireless networking (e.g., WiFi) has significantly reduced the need for such physical data ports in residential and public buildings Because of the rapid evolution from hard-wired to wireless networking, a large number of unused or abandoned physical Ethernet ports remain installed in many residential and public buildings that had been wired for physical networking before wireless networks became ubiquitous.

In parallel with the growth of wireless networking, personal electronic devices such as mobile phones, tablet computers, and the like have evolved to include USB ports for data connectivity and device charging. As a result of these developments, the need for physical Ethernet data ports has declined, while the need for readily available USB charging stations has increased.

The above-described deficiencies of current data and charging port architectures are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to portable and/or modular devices for converting existing data ports to USB charging ports. In one or more embodiments, a modular conversion device converts power-over-Ethernet (PoE) power to USB power for charging of a portable device. In one or more embodiments, the conversion device can comprise a modular jack configured to be installed in a wall plate as a replacement for an existing data port (e.g., an RJ45 port). The modular device can convert available PoE power (e.g., from a PoE switch) to USB power for delivery via a USB charging port included on the module.

In another example embodiment, the conversion device can comprise a portable conversion device (e.g., a dongle) configured to plug into an existing data port. The portable device converts available PoE power from the data port to USB power for delivery via a USB charging port on the device.

Some embodiments may comprise multi-port conversion devices that include both a USB charging port and an RJ45 data port. According to such embodiments, the conversion device plugs into or replaces an existing RJ45 data port, converts available PoE power to USB power for delivery via a USB charging port on the device, and also extends data connectivity from the existing RJ45 data port to a native data port of the conversion device.

In some embodiments, the conversion device's USB charging port can also support data communications (e.g., communication via TCP/IP protocol). Such embodiments can format USB data received at the USB port to conform to an Ethernet protocol (e.g., TCP/IP) and send the formatted data over an Ethernet network. Likewise, the conversion device can format Ethernet data received from the network to conform to USB protocol for delivery to the USB port of the conversion device.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF DRAWINGS

FIG. 3 illustrates a PoE-to-USB power conversion device connected to a PoE switch via an Ethernet cable.

FIG. 4 is a side view of power conversion unit installed in wall plate.

DETAILED DESCRIPTION

Figure 1:
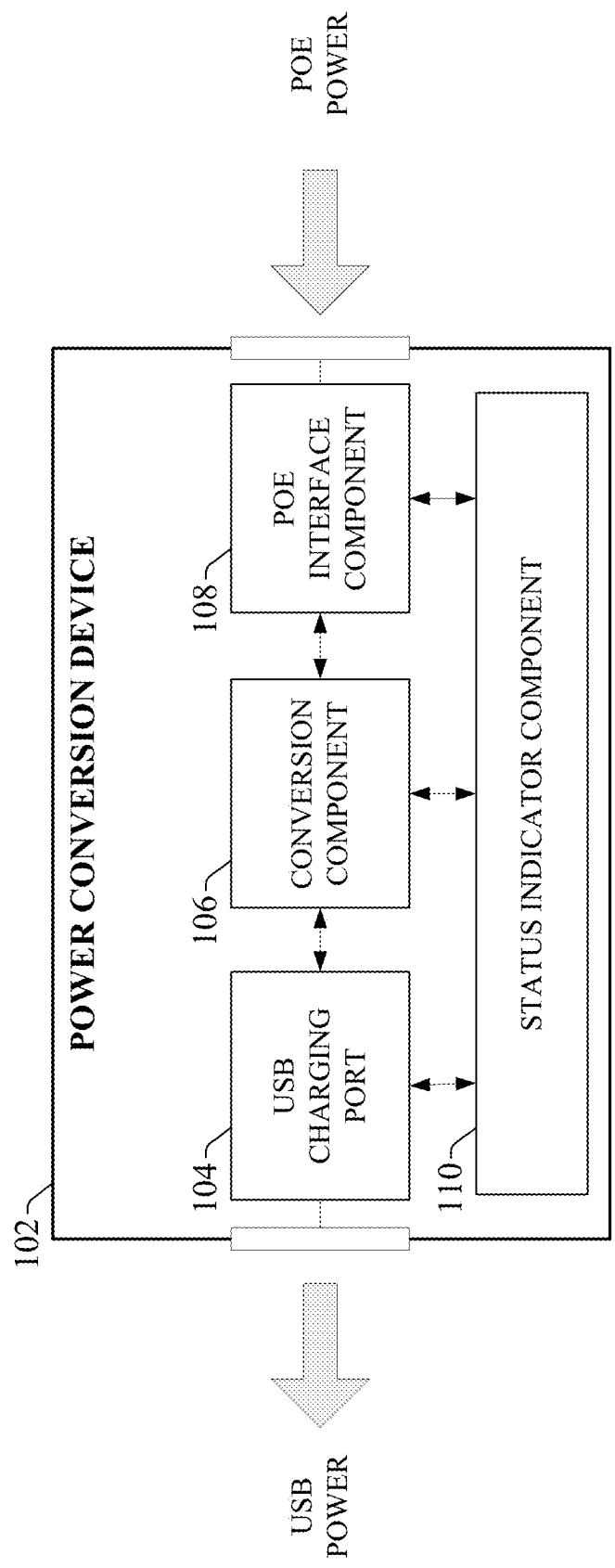
FIG. 1 illustrates an example power conversion device.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 illustrates an example power conversion device 102 capable of converting a data port (e.g., an RJ45 Ethernet port) to a USB charging port. Power conversion device 102 receives power-over-Ethernet (PoE) power via a PoE interface component 108. In one or more embodiments, PoE interface component 108 can receive power from a PoE switch, which delivers power over Ethernet cable (e.g., CAT-5 cable), or from any suitable Source of PoE power. Any suitable method can be used to interface the PoE interface component 108 with the PoE power source. In a non-limiting example, PoE interface component 108 can include wiring terminals that can be electrically connected to an output port of the PoE power source (e.g., by terminating conductors of an Ethernet cable on the terminals of the PoE interface component 108 using a 110 punch-down block or other terminating means). In another example embodiment, the PoE interface component 108 can include an RJ45 plug that inserts into an existing RJ45 Ethernet port, allowing PoE power available on the Ethernet port to be delivered to the PoE interface component 108. These various designs are described in more detail below.

Power conversion device 102 also includes a conversion component 106 configured to electrically convert the PoE power received at the PoE interface component 108 to USB-compatible power. Given the multiple standards in use for transmission of PoE power (e.g., IEEE 802.3af, 802.3at, etc.), one or more embodiments of conversion component 106 can automatically detect which standard is being used to transmit the PoE power detected by PoE interface component 108. For example, IEEE 802.3af delivers 12.95 W power at a nominal voltage of 48 VDC (typically between 37 and 57 VDC) and a maximum current of 350 mA, while IEEE 802.3at delivers 25.5 W power at a voltage range of 42.5-57.0 VDC and maximum current of 600 mA. In response to detection of input power received by PoE interface component 108 (e.g., from a PoE switch), conversion component 106 can determine whether the PoE power conforms to IEEE 802.3af or 802.3at. Depending on the determined PoE standard, conversion component 106 will convert the received PoE power to USB power, which is typically delivered at 5 VDC with a maximum current of 500 mA (for USB 2.0) or 900 mA (for USB 3.0).

Conversion component 106 can identify the PoE standard based on one or more of the detected voltage level, a detected power level, a detected current, or a determination of which conductors of the Ethernet cable are delivering the PoE power. Since PoE power can be delivered on different conductors of the Ethernet cable depending on the standard being used, conversion component 106 can be configured to automatically select the appropriate power conductors of the Ethernet cable from which to draw power based on the determination of the PoE standard being used. Conversion component 106 can then convert the power delivered by the selected conductors to the appropriate USB power standard. Some embodiments of conversion component 106 may also be configured to perform digital negotiation with the PoE power source (e.g., a PoE switch or other source) to set a desired level of output power and open the port for maximum available charging.

Conversion component 106 delivers the converted PoE power—now conforming to USB standard—to USB charging port 104, which can deliver the converted USB power to a USB-capable electronic device (e.g., phone, tablet computer, laptop, etc.). Conversion component 106 delivers the USB power—converted from the incoming PoE power—to the appropriate conductors of the USB charging port 104 to facilitate charging a connected device, thereby providing a USB charging port for the device. USB charging port 104 can conform to any USB jack type, including but not limited to standard USB, mini USB, micro USB, USB 2.0, USB 3.0, or other standard. In one or more embodiments, power conversion device 102 can include multiple USB charging ports 104, each corresponding to a different physical USB standard (e.g., standard, mini, micro, etc.) to facilitate compatibility with multiple different types of USB devices, or alternatively multiple ports of the same type.

One or more embodiments of power conversion device 102 can also include a status indicator component 110 for controlling one or more status indicators (not shown) integrated with the conversion device. The status indicators can convey status information relating to operation of power conversion device 102 including, but not limited to, an indication that PoE power is present at the PoE interface component 108, identification of the type of PoE power detected (e.g., 802.3af, 802.3at Mode 1, 802.3at Mode 2, etc.), a charging status of a connected USB device (e.g., "connected and charging," "charging complete," "no device detected," etc.), or other such status information. The status indicators can comprise any suitable visual or audible output components; e.g., light emitting diodes (LEDs), audible signal generators, electronic text display etc.

In some multi-port embodiments, power conversion device 102 may include multiple USB charging ports 104, each associated with its own conversion component 106. The different conversion components may be configured to convert the incoming PoE power to respective different levels of output USB power, allowing a single power conversion device 102 to include multiple USB charging ports configured to output several different USB power levels.

Figure 2B:
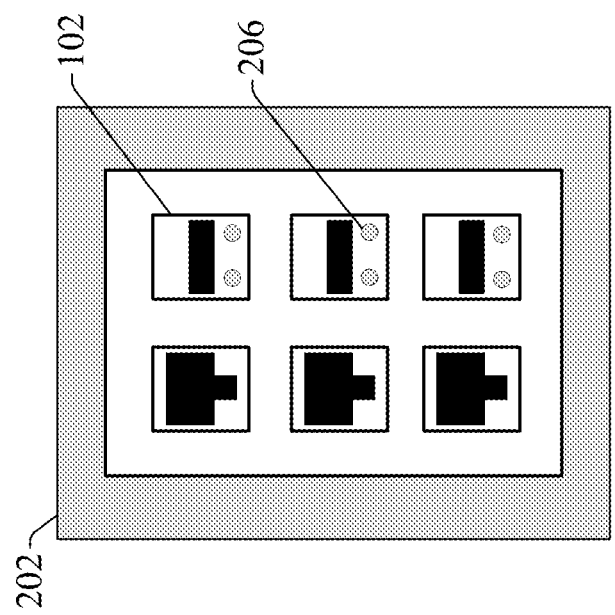
FIG. 2b illustrates a wall plate with three Ethernet data ports replaced with modular USB charging ports.
Figure 2A:
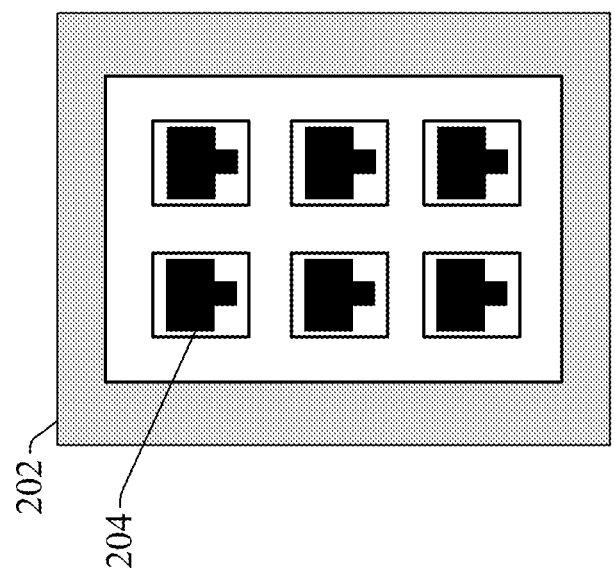
FIG. 2a illustrates a wall plate with six Ethernet data ports.

Using the retrofitable power conversion device described herein, existing Ethernet data ports can be easily repurposed as USB charging ports. FIGS. 2a and 2b illustrate conversion of wall-mounted Ethernet ports to USB charging ports according to one or more embodiments of this disclosure. As illustrated in FIG. 2a, six Ethernet ports 204 are disposed in a wall plate 202. Ethernet ports 204 are mounted in respective square windows of wall plate 202, and are wired into one or more existing Ethernet networks (not shown). That is, each of the Ethernet ports 204 is connected to an Ethernet cable that runs within or through the wall and connects to a network infrastructure device (e.g., a switch, a router, a hub, a server or other networked device, etc.). Power is provisioned on the one or more Ethernet networks by virtue of a PoE switch, PoE injector, or other such power source.

According to one or more embodiments, any of the six Ethernet ports 204 can be removed and replaced with a modular power conversion device 102, thereby converting the Ethernet port to a USB charging port. FIG. 2b illustrates replacement of the three right-hand Ethernet ports 204 with respective USB power conversion devices 102. In this example, power conversion devices 102 have a mounting footprint compatible with the square windows of wall plate 202, allowing easy replacement of the Ethernet ports 204 with power conversion devices 102. Each power conversion device 102 includes one or more LEDs 206 to indicate status information (e.g., PoE power present, device connected, etc.).

The power conversion devices 102 are connected to the existing Ethernet network(s) behind the wall plate 202. For example, as depicted in FIG. 3, an existing Ethernet cable 302 that had previously been connected to one of the removed Ethernet ports 204 can be connected to power conversion devices 102, thereby connecting the power conversion device 102 to the existing PoE switch or other PoE power source, as illustrated in FIG. 3. A user can then plug a USB-capable device to the USB port 304 of power conversion device 102 to facilitate charging the device. Various embodiments of power conversion device 102 can support connection to respective different types of Ethernet cable 302 (e.g., CAT-5, CAT-6, or other cable standard that supports Ethernet communication). In some embodiments, power conversion device 102 can include a pre-integrated Ethernet cable 302 for wiring into an existing Ethernet network or networking device. FIG. 4 is a side view of power conversion device 102 installed in wall plate 202.

Figure 5:
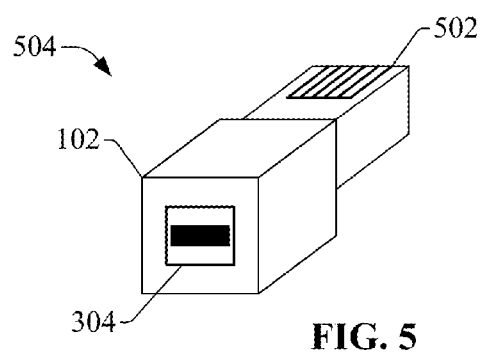
FIG. 5 illustrates a portable USB charging port device configured to plug into an existing Ethernet port.
Figure 6:
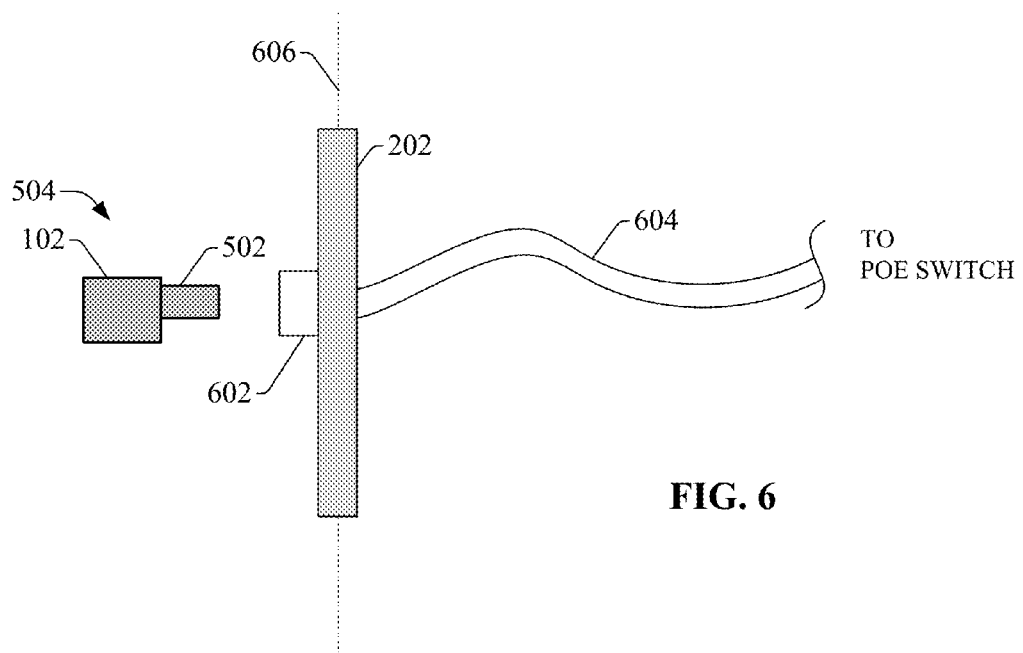
FIG. 6 illustrates a modular USB charging port configured to plug into an RJ45 jack.
Figure 7:
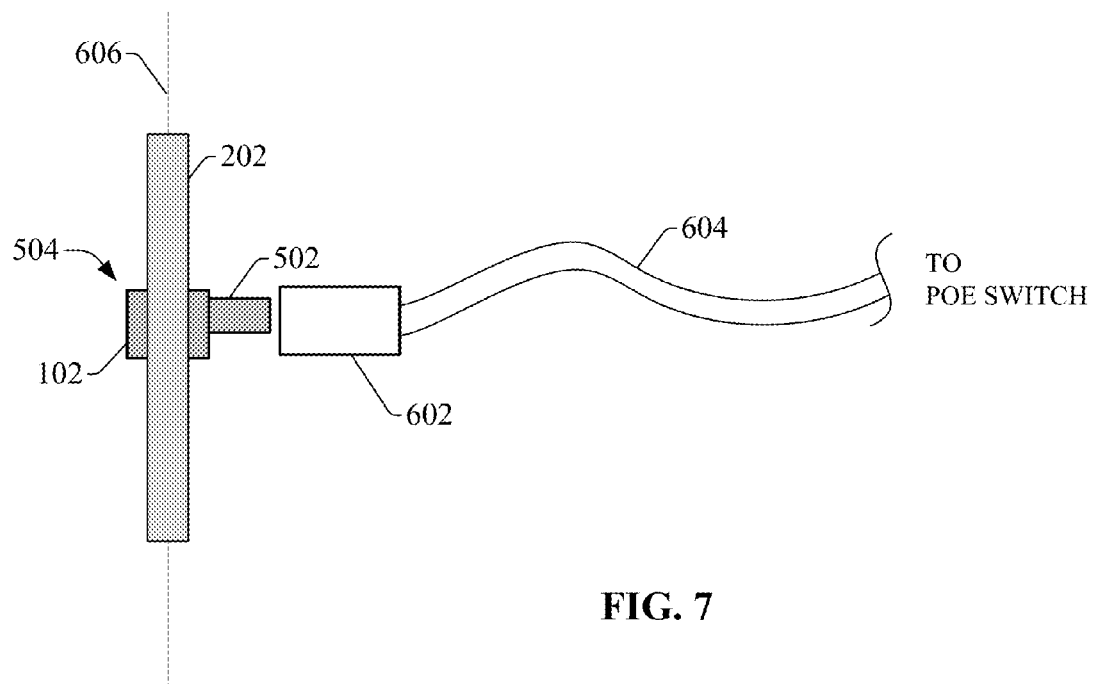
FIG. 7 illustrates a modular USB charging port mounted in a wall plate.

FIGS. 5-7 illustrate a portable modular embodiment of power conversion device 102. This embodiment can be plugged into an existing wall-mounted Ethernet jack 602 (e.g., an RJ45 jack) without removing the Ethernet jack 602 from the wall plate 202 (as depicted in FIG. 6), or can replace the existing Ethernet jack 602 in the wall plate 202, allowing the Ethernet jack 602 to connect to the conversion device behind the wall (as depicted in FIG. 7). FIG. 5 is a three-dimensional view of this power conversion module 504. As shown in this figure, power conversion device 102 includes an integrated RJ45 plug 502 that can be inserted into the existing Ethernet jack 602. In the scenario illustrated in FIG. 6, the Ethernet jack 602 is mounted to wall plate 202 mounted on a wall 606 and connected to a PoE switch via cable 604 (e.g., CAT-5, CAT-6, or other type of Ethernet cable). PoE power from the Ethernet jack 602 is provided to PoE interface component 108 (see FIG. 1) via the RJ45 plug 502. This portable embodiment of the power conversion device 102 can be carried by a user and used to quickly convert an Ethernet data port (e.g., at a public facility such as a library, hospital, airport, school, etc.) to a USB charging port.

Alternatively, as illustrated in FIG. 7, the power conversion module 504 can replace the Ethernet jack 602 in the wall plate 202, and the existing Ethernet jack 602 can connect to the RJ45 plug of the conversion device behind the wall 606, resulting in a fixed installation.

Figure 8:
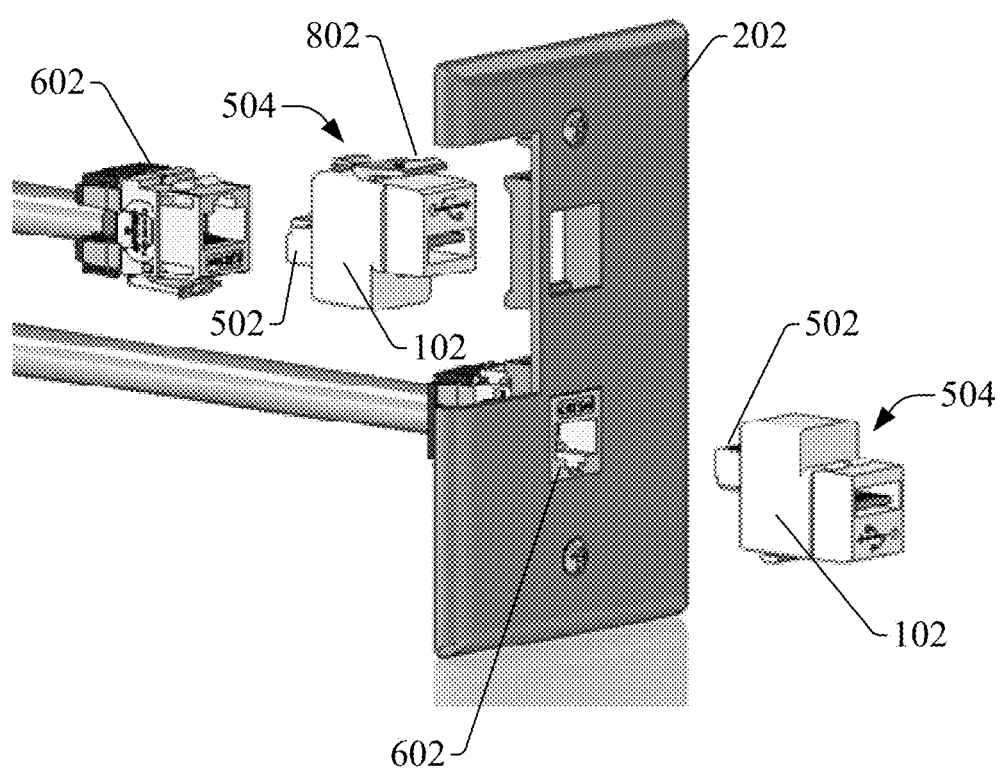
FIG. 8 is a three-dimensional view of the modular USB charging port being used as a portable device and in a fixed installation.

FIG. 8 is a three-dimensional view of the power conversion module 504 being used in both portable and fixed installation scenarios. The lower port of wall plate 202 depicts the power conversion module 504 being inserted into an existing wall-mounted Ethernet jack 602 (as illustrated in FIG. 6), thereby providing a portable USB charging port that can travel with the user. The top port of wall plate 202 illustrates a fixed installation of the power conversion module 504, wherein the existing Ethernet jack 602 is removed from wall plate 202 and the power conversion module 504 replaces the Ethernet jack 602 in the vacant window of the wall plate 202. The Ethernet jack 602 can then be connected to the RJ45 plug on the back of the power conversion module 504 behind the wall.

Power conversion module 504 can include a flexible retaining latch 802 to facilitate connection to the wall plate 202. In some embodiments, this retaining latch 802 can be removed from the power conversion module 504 if the user intends to only use the device as a portable (non-fixed) converter, thereby streamlining the surface of the power conversion module 504 while being used as a portable device.

Figure 9:
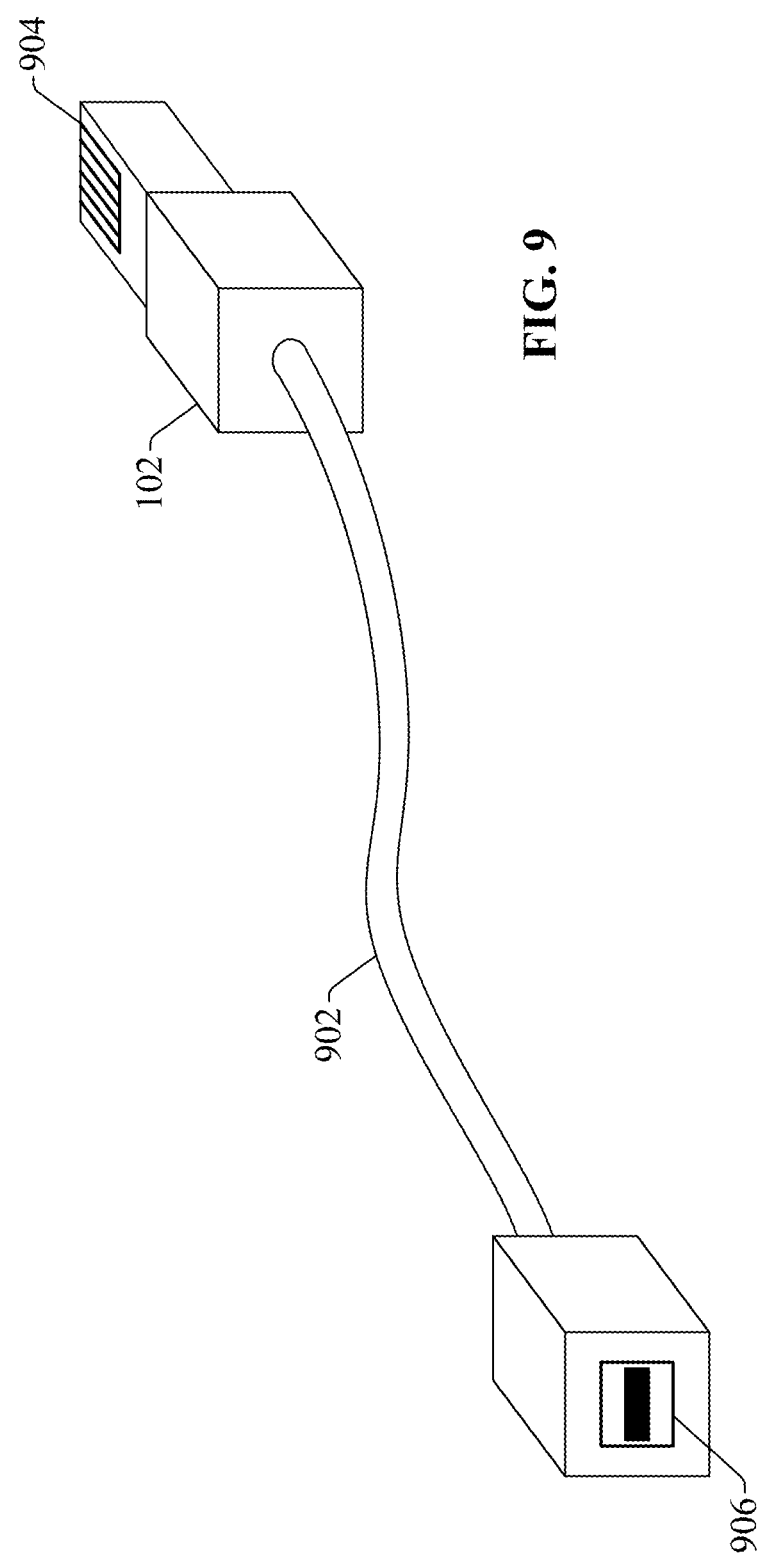
FIG. 9 illustrates a USB charging port attached to an RJ45 plug via a USB cable.

FIG. 9 illustrates another embodiment of power conversion device 102 configured to plug into an existing Ethernet data port. Similar to the embodiment depicted in FIGS. 5-7, the embodiment illustrated in FIG. 9 includes an RJ45 plug 904 that can be inserted into an existing Ethernet port, and PoE power on the Ethernet port is converted to USB power for delivery to USB port 906. However, in this example USB port 906 is attached to power conversion device 102 via USB cable 902, allowing greater freedom of movement of the USB port 906 while plugged into the Ethernet port. Although FIG. 9 depicts the power conversion device 102 as being attached to the RJ45 plug 904, the power conversion components can alternatively be housed with the USB port 906 on the other end of cable 902 in some embodiments.

A variation of the embodiment depicted in FIG. 9 can also be used in connection with the modular embodiments illustrated in FIGS. 2-4. For example, USB port 906 can be configured to mount inside a square window of wall plate 202, with USB cable 902, power conversion device 102, and RJ45 plug 904 residing inside the wall behind the wall plate 202. RJ45 plug 904 can then be plugged into a port of an existing network infrastructure device (e.g., PoE switch, hub, router, networked device, etc.) to provide PoE power to the power conversion device 102.

Although the previous examples describe power conversion devices that transform PoE power to charging power that is then output via a USB port, other embodiments of power conversion device 102 may be configured to convert the PoE power to a different type of device charging protocol for delivery to a different type of device connector. In general, power conversion devices that convert PoE power to charging power and conform to the form factors described herein are within the scope of one or more embodiments of this disclosure.

Figure 10:
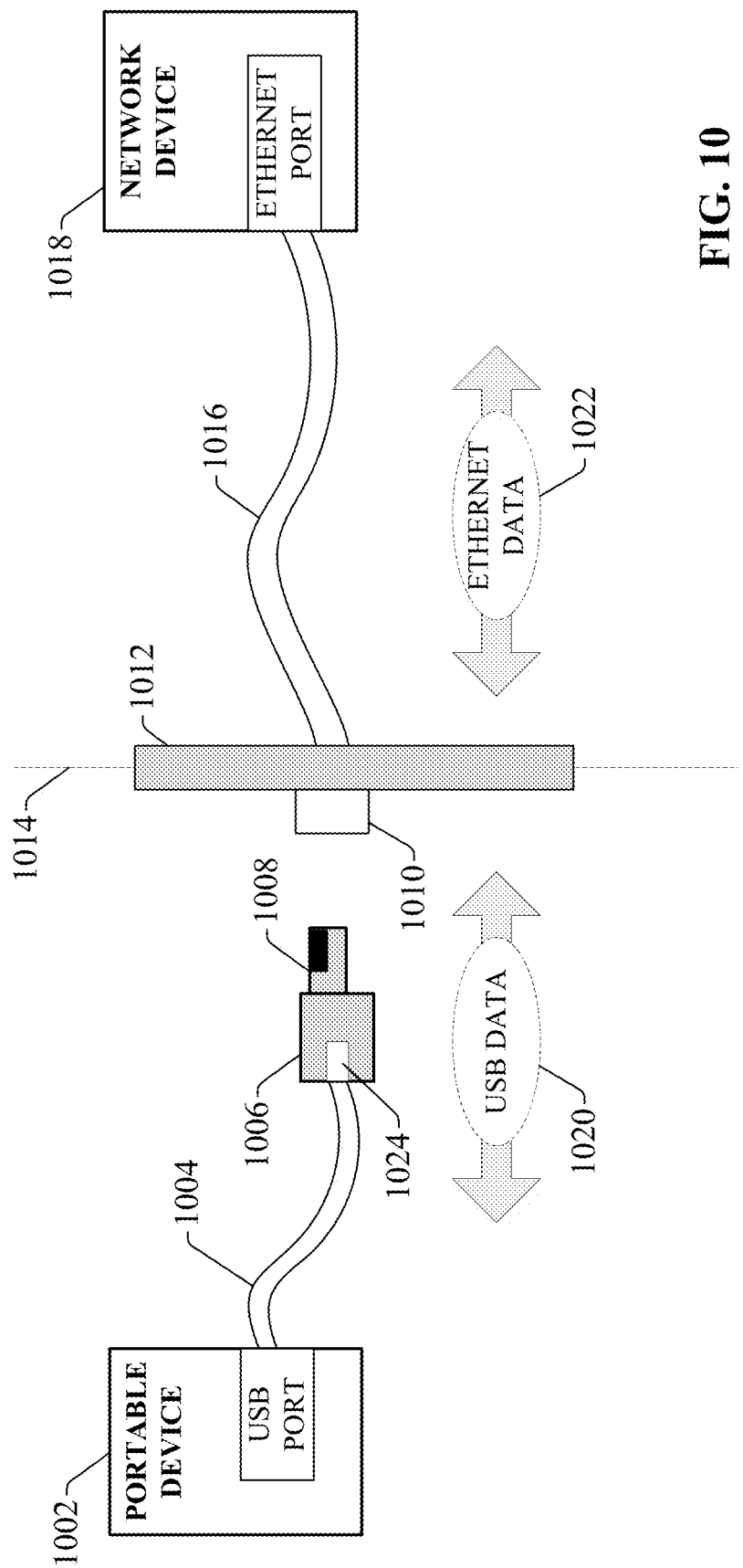
FIG. 10 illustrates a conversion device that both converts PoE power to USB power and facilitates transfer of data between a USB device and an Ethernet network.

Some embodiments of the PoE-to-USB power conversion device described herein can also be configured to transfer data as well as power. According to such embodiments, in addition to converting PoE power to USB power, the conversion device can also transfer data between the USB port of the conversion device and the Ethernet network. FIG. 10 illustrates an example configuration that uses a conversion device 1006 to both convert PoE power to USB power and transfer data between a USB device and an Ethernet network. Conversion device 1006 includes an RJ45 plug 1008 configured to interface with an Ethernet port 1010 in wall plate 1012. Ethernet port 1010 is connected to a network device 1018 (e.g., a server, a router, a hub, a switch, etc.) via Ethernet cable 1016 (e.g., a CAT-5 cable) on the other side of wall 1014. Similar to previous examples, conversion device 1006 converts PoE power on cable 1016 to USB power, which is delivered to a USB port 1024 on the outward face of conversion device 1006. Thus, plugging a portable device 1002 into the USB port 1024 of conversion device 1006 facilitates charging of the portable device 1002 using the converted PoE power.

In addition, conversion device 1006 can convert USB data 1020 generated by portable device 1002 and sent over USB cable 1004 to Ethernet protocol (e.g., TCP/IP) for transfer over Ethernet cable 1016. Similarly, conversion device 1006 can convert Ethernet data 1022 (e.g., TCP/IP data) generated by network device 1018 to USB protocol for transfer over USB cable 1004. Thus, conversion device 1006 facilitates data transfer between portable device 1002 and network device 1018.

Although FIG. 10 depicts the conversion device 1006 as having a similar form factor as the power conversion device depicted in FIG. 5 (that is, a portable conversion device with an integrated RJ45 plug), it is to be appreciated that conversion device 1006 can also be embodied as a modular wall jack embodiment having a form factor similar to that depicted in FIGS. 2-4. In such embodiments, Ethernet port 1010 can be removed from wall plate 1012, and conversion device 1006 can be installed in the vacant window of wall plate 1012. Ethernet cable 1016 can then be connected to the conversion device to place the conversion device on the network. In this way, conversion device 1006 can be installed as a fixed replacement for Ethernet port 1010.

Figure 11:
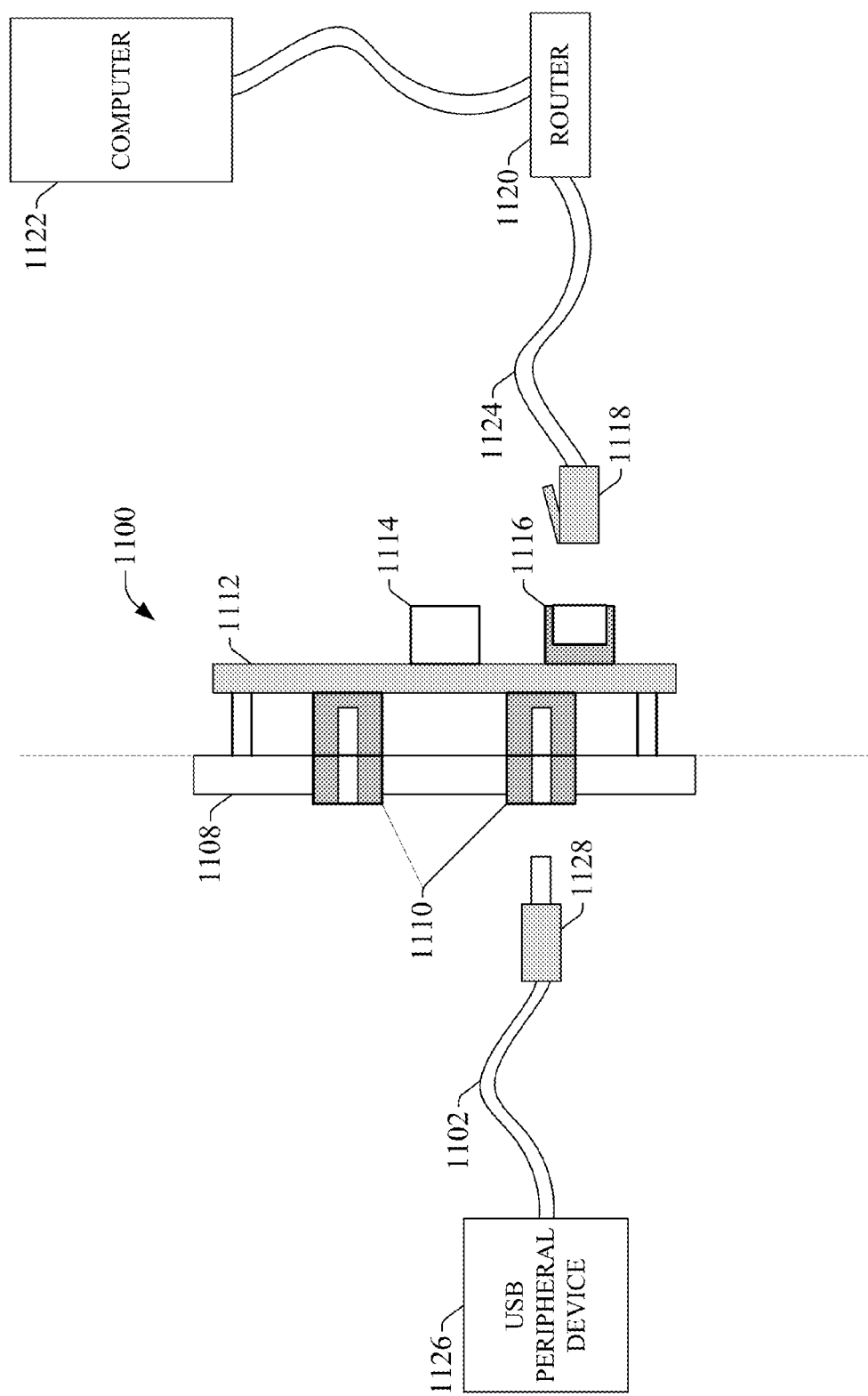
FIG. 11 illustrates a wall-mounted USB-to-TCP/IP conversion device.

In another embodiment, the USB-to-Ethernet conversion described above can be performed by a fully integrated wall-mountable conversion device. For example, FIG. 11 illustrates a wall-mounted USB-to-TCP/IP conversion device 1100. In this example, a wall plate 1108 includes two USB ports 1110. A USB-to-TCP/IP converter 1114 is mounted to a printed circuit board 1112 attached to the wall plate 1108. Printed circuit board 1112 also has mounted thereto an RJ45 jack 1116. USB-to-TCP/IP converter 1114 is configured to convert TCP/IP data received at the RJ45 jack 1116 to USB formatted data and deliver the USB data to the USB ports 1110. The USB-to-TCP/IP converter 1114 is also configured to convert USB data received at either of the two USB ports 1110 to TCP/IP data (or other Ethernet protocol) and send the data to the RJ45 jack 1116.

USB-to-TCP/IP conversion device 1100 can be used to complete a USB connection over an Ethernet network. In a non-limiting example application, a USB peripheral device 1126 (e.g., a speaker, a webcam, a printer, etc.) can be plugged into USB port 1110 using a USB cable 1102 by means of USB connector 1128. A computer 1122 located in another room is connected to an existing Ethernet network via router 1120. An Ethernet plug 1118 terminated to Ethernet cable 1124 of router 1120 can be plugged into RJ45 jack 1116 of USB-to-TCP/IP conversion device 1100, thereby networking computer 1122 to the conversion device 1100. Once connected in this manner, USB-to-TCP/IP converter 1114 can facilitate data exchange between USB peripheral device 1126 and computer 1122. That is, USB-to-TCP/IP converter 1114 converts TCP/IP data from computer 1122 to USB-formatted data and sends the data to USB peripheral device 1126 via USB port 1110, and converts USB data from USB peripheral device 1126 to TCP/IP data and sends the converted data to the computer via the Ethernet network.

Although FIG. 11 depicts the connector mounted to printed circuit board 1112 as being a female jack (jack 1116), such that the jack 1116 receives plug 1118 fitted on the end of cable 1124, in some embodiments jack 1116 may be replaced with a male connector (e.g., an RJ45 plug). Such embodiments allow Ethernet cable 1124 to be fitted with a female connector in place of the male Ethernet plug 1118. In general, the connector mounted to printed circuit board 1112 can be either a female connector (e.g., jack 1116) or a male connector without departing from the scope of one or more embodiments of this disclosure.

For applications in which computer 1122 is required to exchange data with the USB peripheral device 1126 using a native USB port on the computer, another USB-to-TCP/IP conversion device 1100 can be installed between router 1120 and computer 1122 to facilitate converting Ethernet data received from the USB peripheral device 1126 back to USB at the computer end. Alternatively, router 1120 can include software and/or hardware configured to convert TCP/IP data received from USB peripheral device 1126 (and converted from an original USB signal) back to USB for delivery to the computer's USB port. In this way, USB-to-TCP/IP conversion device 1100 allows computer 1122 to communicate with USB peripheral devices (e.g., USB peripheral device 1126) over longer distances than can be achieved using USB alone by leveraging TCP/IP protocol. In some embodiments, USB-to-TCP/IP conversion device 1100 may also include the PoE-to-USB power conversion features discussed above in connection with FIG. 1. That is, some embodiments of USB-to-TCP/IP conversion device 1100 may additionally include a conversion component 106 and a USB charging port 104, allowing one or more of the USB ports 1110 to serve as USB charging ports.

Figure 12:
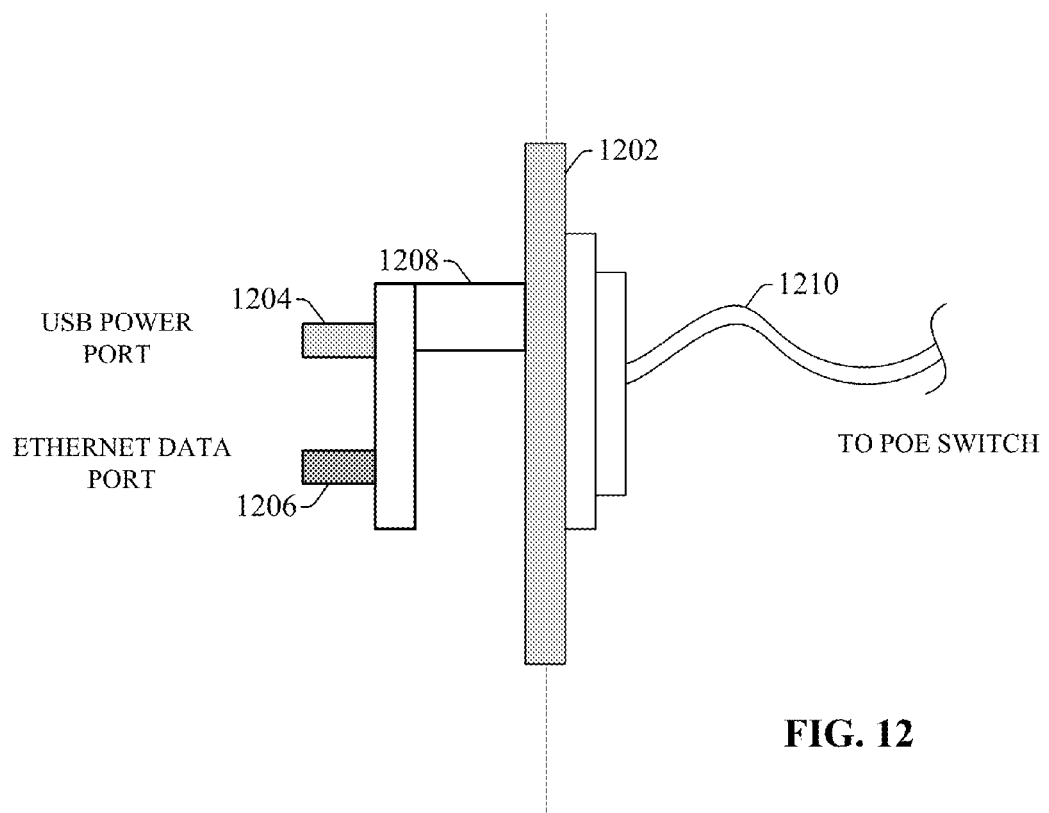
FIG. 12 illustrates a two-port embodiment of a modular PoE-to-USB power conversion device.

FIG. 12 illustrates a two-port embodiment of the modular conversion device described herein. Similar to previous examples, a conversion device 1208 is configured to convert PoE power from Ethernet cable 1210 (e.g., a CAT-5 cable) to USB power. Conversion device 1208 can conform to any of the modular or portable form factors described above. For example, conversion device 1208 can be equipped with an integrated RJ45 interface (or other Ethernet-compatible interface) that can be plugged into an existing Ethernet data port. Alternatively, conversion device 1208 can be configured to mount in a vacant window of wall plate 1202 as a replacement for an Ethernet data port.

Conversion device 1208 converts the PoE power to USB power, and delivers the converted USB power to USB power port 1204, which thus serves as a USB charging port. In this embodiment, conversion device 1208 also includes an Ethernet data port 1206 (e.g., an RJ45 port). Conversion device 1208 is configured to pass TCP/IP data between Ethernet cable 1210 and Ethernet data port 1206. Thus, conversion device 1208 facilitates conversion of an existing Ethernet data port to a USB charging port, while maintaining an available Ethernet data port for exchanging TCP/IP data with the Ethernet network.

In some embodiments, USB power port 1204 can also serve as a TCP/IP data port as well as a USB charging port (similar to the embodiment described above in connection with FIG. 10). In such embodiments, conversion device 1208 can format TCP/IP data received via the USB port for transfer over Ethernet cable 1210, and similarly format TCP/IP data received via Ethernet cable 1210 for transfer over USB for delivery over USB power port 1204.

Figure 13:
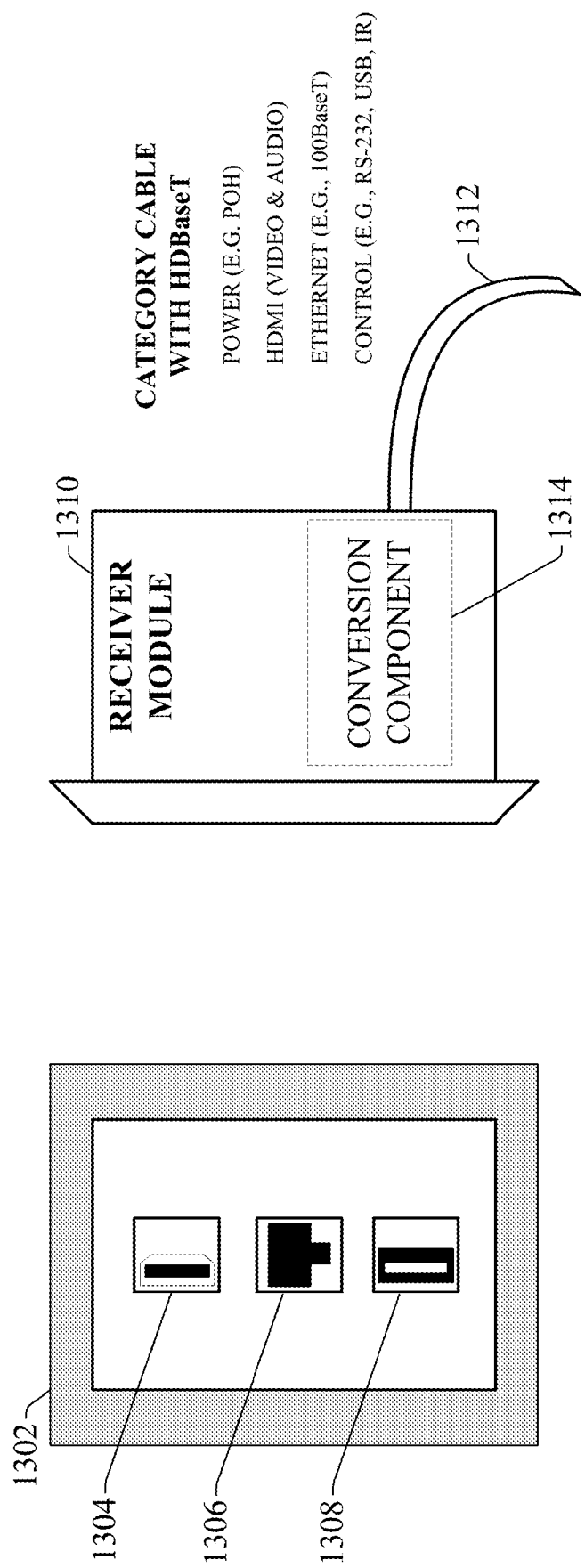
FIG. 13 illustrates a multimedia interface embodiment for providing charging and audio/video connectivity over an HDBaseT link.

FIG. 13 illustrates a high-definition multimedia interface (HDMI) embodiment for providing power and data connectivity over an HDBaseT link. In this example, an HDBaseT receiver module 1310 is configured to receive a category cable 1312 (e.g., CAT-5, CAT-6, etc.) provisioned with HDBaseT, which supports power (power-over-HDBaseT, or PoH), HDMI video and audio signals, Ethernet, and control signaling (e.g., RS-232, USB, infrared, etc.). In some embodiments, receiver module 1310 can include an RJ45 port that receives category cable 1312, or terminals labeled to indicate which conductors of cable 1312 are to be connected to the respective terminals. Three different ports are located on a wall plate 1302 mounted to the front of receiver module 1310—an HDMI port 1304, an RJ45 data port 1306, and a USB charging port 1308.

In an example configuration, an HDBaseT transmitter (not shown) may be provisioned at the opposite end of the HDBaseT link relative to receiver module 1310. The HDBaseT transmitter serves as the source of HDMI audio and video signals, which are transmitted to receiver module 1310 via the HDBaseT link over category cable 1312. In some scenarios, the HDBaseT transmitter includes a power source that provides PoH power to the HDbaseT link.

The HDBaseT receiver module 1310 is configured to connect each of the three ports 1304, 1306, and 1308 to the appropriate audio/video, data, or control signals provided by the HDBaseT link via category cable 1312. That is, receiver module 1310 passes HDMI audio and video signals from the HDBaseT link to HDMI port 1304, and passes Ethernet signals between Ethernet port 1306 and the HDBaseT link. In addition, receiver module 1310 can include a conversion component 1314 configured to convert PoH power on the HDBaseT link to USB power, and provide the converted USB power to USB charging port 1308. Thus, given an HDBaseT link over category cable, the receiver module 1310 provides ports for HDMI and Ethernet data communication, as well as a USB charging port 1308 for charging portable devices having a USB interface.

Although HDBaseT receiver module 1310 is described above as having an HDMI port 1304 for outputting HDMI audio and video data from the HDBaseT link, other embodiments of HDBaseT receiver module 1310 can support other audio/video interface standards instead of HDMI, including but not limited to digital visual interface (DVI), Thunderbolt, or DisplayPort.

In some embodiments, USB charging port 1308 can also serve as a USB data port. In such embodiments, receiver module 1310 can facilitate passing of data between USB charging port 1308 and the control signals of the HDBaseT link, or between USB charging port 1308 and the Ethernet data signals of the HDBaseT link. In the latter scenario, conversion component 1314 can be further configured to convert between USB and TCP/IP data formats, as described above in connection with the embodiment of FIG. 10.

In some embodiments, receiver module 1310, rather than the HDBaseT transmitter, can include a power supply that provides PoH power to the HDBaseT link. Such embodiments of receiver module 1310 can both generate the PoH power for the HDBaseT link and convert the PoH power to USB charging power for USB charging port 1308. Alternatively, the power supply of receiver module 1310 may include separate power outputs for the USB charging port (a USB power output) and the HDBaseT link (a PoH power output).

In an example application, embodiments of receiver module 1310 can be used to power a high-definition display device having a relatively low power requirement. For example, an HDMI input cable of a television unit or other display device that utilizes audio and video signal inputs can be plugged into the HDMI port 1304 so that audio/video signals from the HDBaseT link can be delivered to the display device. The display device may also include a USB power input port, which can be connected to USB port 1308 using a suitable USB cable. The converted USB power provided by USB port 1308 thus powers the display device without the need to plug the device into a separate wall outlet.

Figure 14:
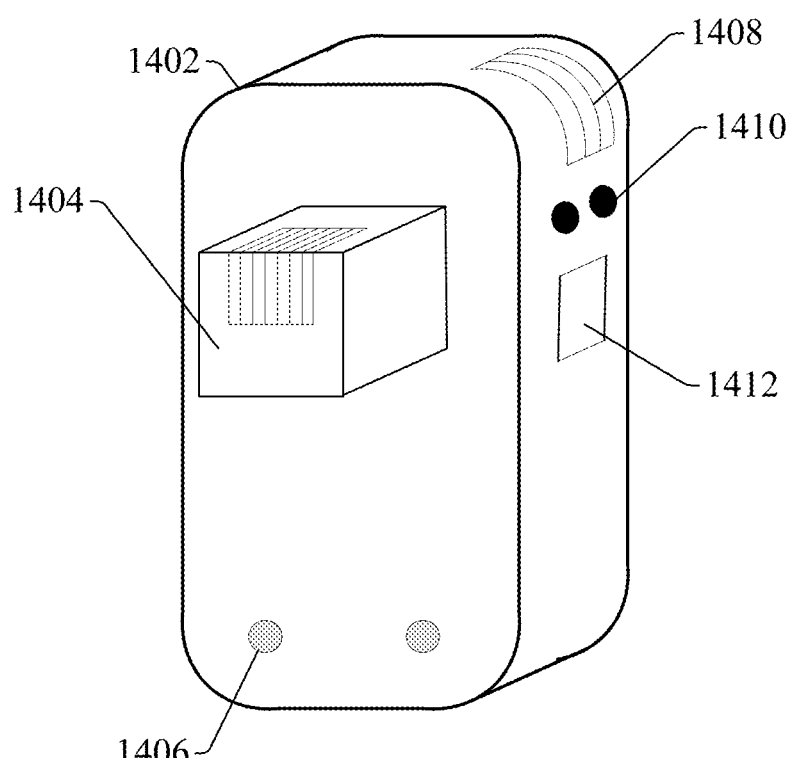
FIG. 14 illustrates a modular wireless networking device configured to leverage PoE power.

FIG. 14 illustrates a portable, modular device that can leverage PoE power to create a wireless network without the need to plug a wireless router into an external power source. Wireless adapter 1402 includes an Ethernet plug 1404 (e.g., an RJ45 plug) that can be inserted into an available Ethernet data port. While plugged into an Ethernet data port that carries PoE power, wireless adapter 1402 leverages the available PoE power to power a wireless transceiver 1408 housed in the wireless adapter 1402, allowing a wireless device within range of the wireless transceiver 1408 to exchange data wirelessly with the Ethernet data port. Bumpers 1406 made of a soft material can be attached to the wall-facing surface of wireless adapter 1402 to prevent abrasion.

In some embodiments, wireless adapter 1402 can also include a built-in Ethernet data port 1412 that allows hard-wired data exchange between a local device and the wall-mounted Ethernet data port. In this way, wireless adapter 1402 ensures that a physical data port remains available even while the adapter is plugged into the wall-mounted data port In addition, some embodiments of wireless adapter 1402 can include audio output jacks 1410 for delivering audio signals to speakers or other audio equipment. Audio signals delivered to the audio output jacks 1410 can be driven by an audio source wirelessly connected to wireless adapter 1402 via the wireless transceiver 1408, or from an audio source on the physical Ethernet network.

Although FIG. 14 illustrates wireless adapter 1402 as a module designed to plug into an RJ45 port mounted in a wall, an alternative embodiment of wireless adapter 1402 may be configured as a module designed to mount behind the wall; e.g., as a replacement for a standard wall-mounted Ethernet port. In such embodiments, the wireless adapter 1402 may be mounted behind an RF transparent wall plate that permits transmitting and receiving of wireless signals through the wall plate. The Ethernet data port 1412 and audio output jacks 1410 can be arranged on a front face of the adapter that is flush with the wall in such embodiments.

Figure 15:
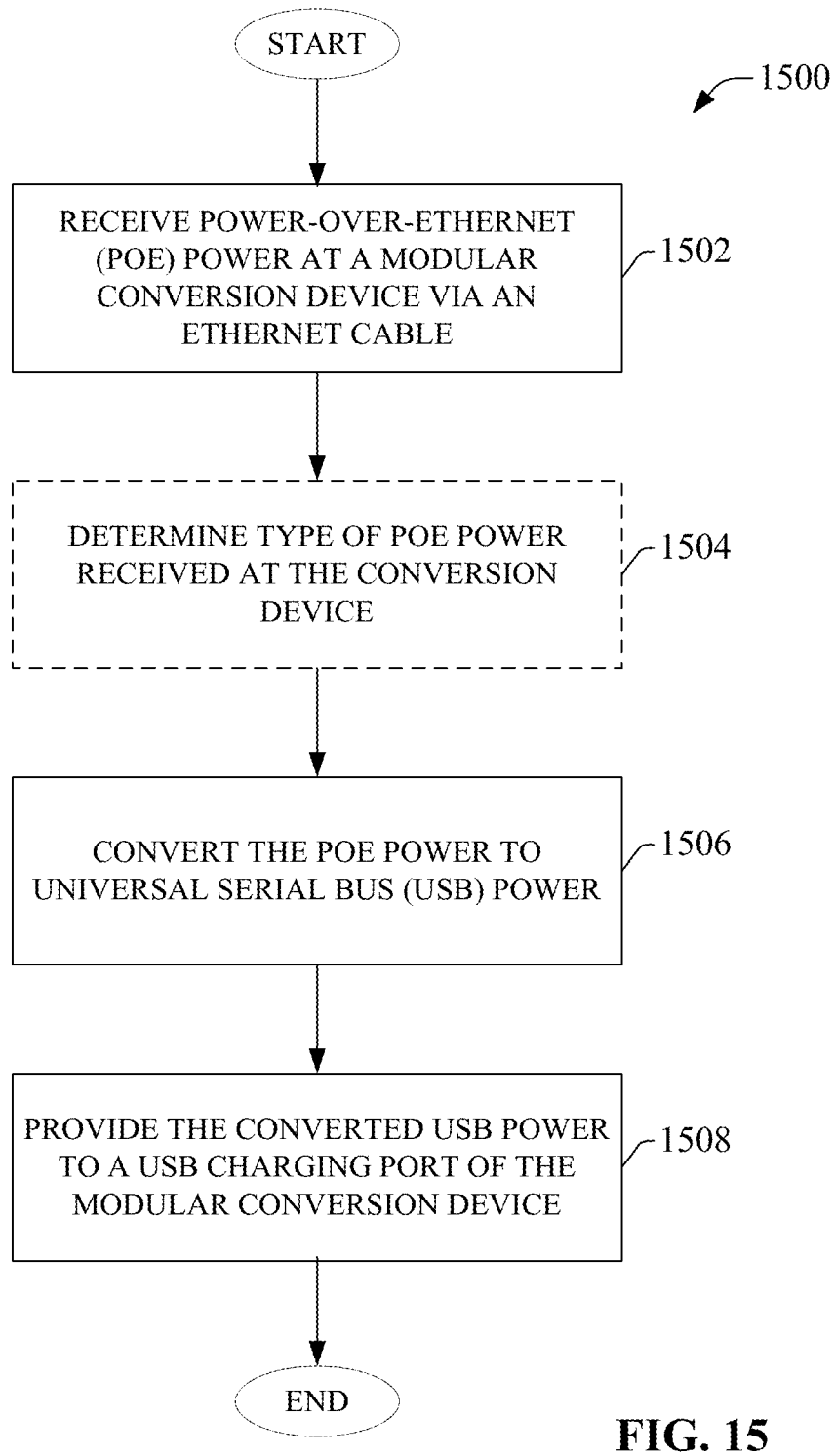
FIG. 15 is a flowchart of an example methodology for converting PoE power to USB power.
Figure 16:
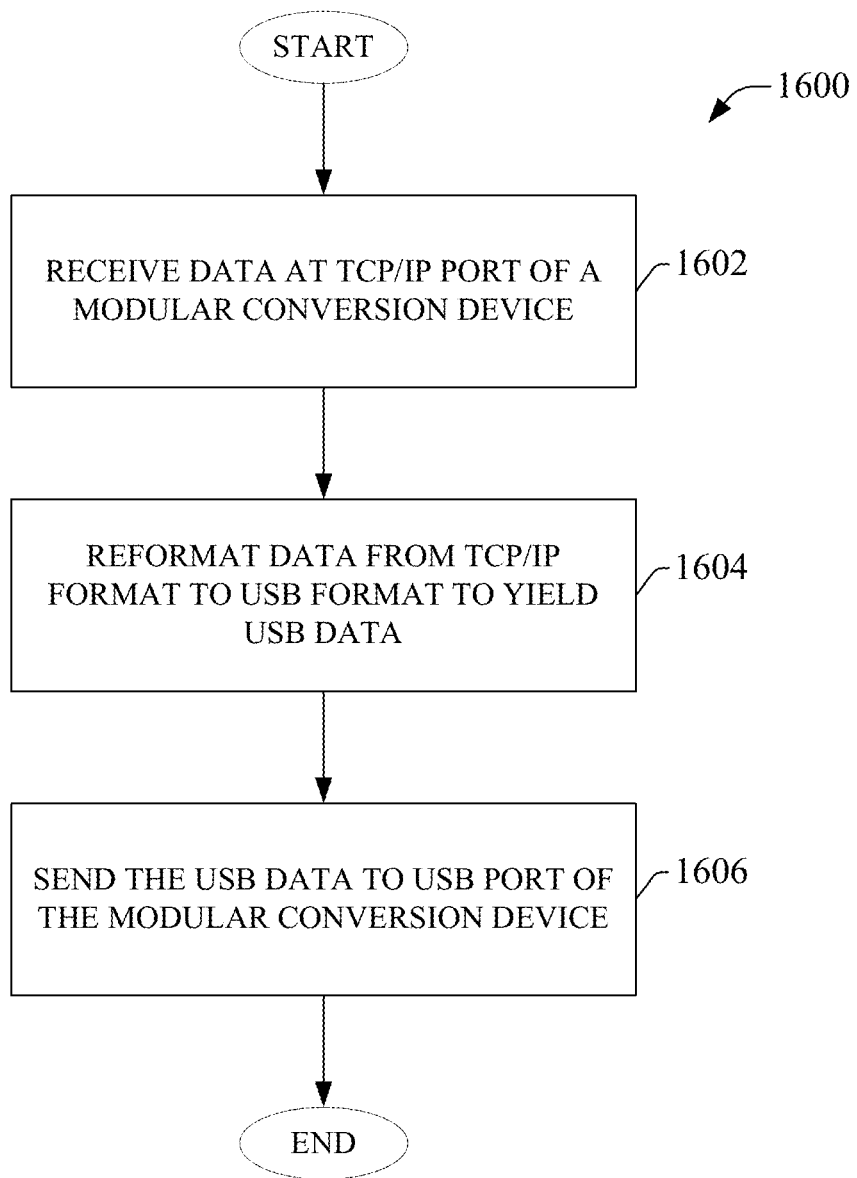
FIG. 16 is a flowchart of an example methodology for converting TCP/IP data to USB data using a modular conversion device.

FIGS. 15-16 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 15 illustrates an example methodology 1500 for converting PoE power to USB power. Initially, at 1302, PoE power is received at a modular conversion device via an Ethernet cable. The modular conversion device can be mounted in an available window of a wall plate; e.g., as a replacement for a removable Ethernet data port. In another example embodiment, the conversion device can comprise a portable device (e.g., a dongle) that can be plugged into an existing Ethernet data port (e.g., an RJ45 port).

Optionally, at 1504, the type of PoE power received at the conversion device is determined. For example, the received PoE power may conform to IEEE 802.3af, 802.3at, or another PoE standard. The conversion device may identify the PoE standard based on such factors as the detected voltage level, a determination of which conductors of the Ethernet cable are being used to deliver the PoE power, or other such indicators.

At 1506, the PoE power is converted to USB power by the conversion device. The manner of the conversion may be based in part on the type of the PoE power determined at step 1504. At 1508, the converted USB power is provided to a USB charging port of the modular conversion device, thereby yielding a USB charging port that leverages PoE power.

FIG. 16 illustrates an example methodology 1600 for converting data from TCP/IP format to USB format using a modular conversion device. Initially, at 1602, data is received at a TCP/IP port of a modular conversion device. As described in previous examples, the modular conversion device can be mounted in an available window of a wall plate, or can comprise a portable conversion device that can be plugged into an existing Ethernet data port (e.g., an RJ45 port). At 1604, the modular conversion device reformats the TCP/IP data to USB format to yield USB data. At 1606, the USB data is sent to a USB port of the modular conversion device.

Figure 17:
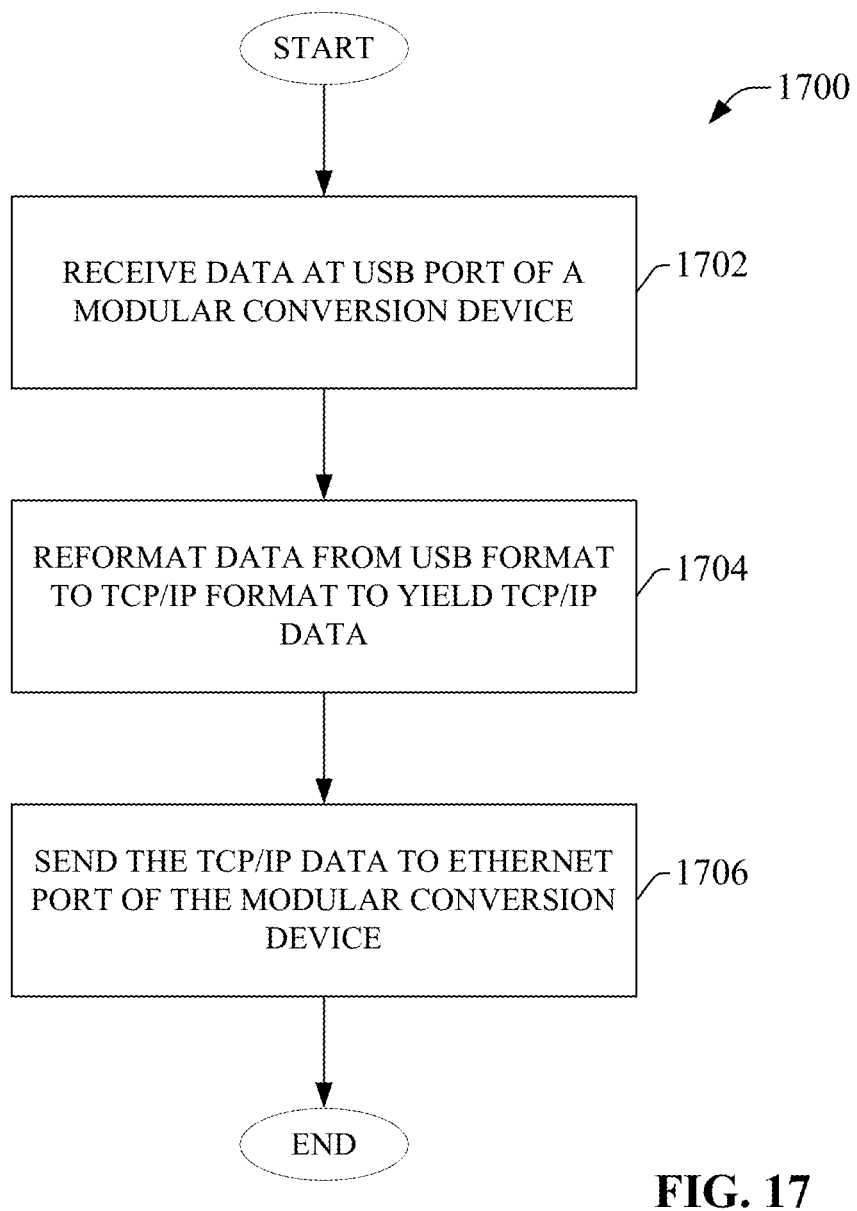
FIG. 17 is a flowchart of an example methodology for converting USB data to TCP/IP data using a modular conversion device.

FIG. 17 illustrates an example methodology 1700 for converting data from USB format to TCP/IP format using a modular conversion device. Initially, at 1702, data is received at a USB port of a modular conversion device, which can be similar to that described above in connection with FIG. 16. At 1704, the modular conversion device reformats the USB data to TCP/IP format to yield TCP/IP data. At 1706, the TCP/IP data is sent to an Ethernet port of the modular conversion device.

Figure 18:
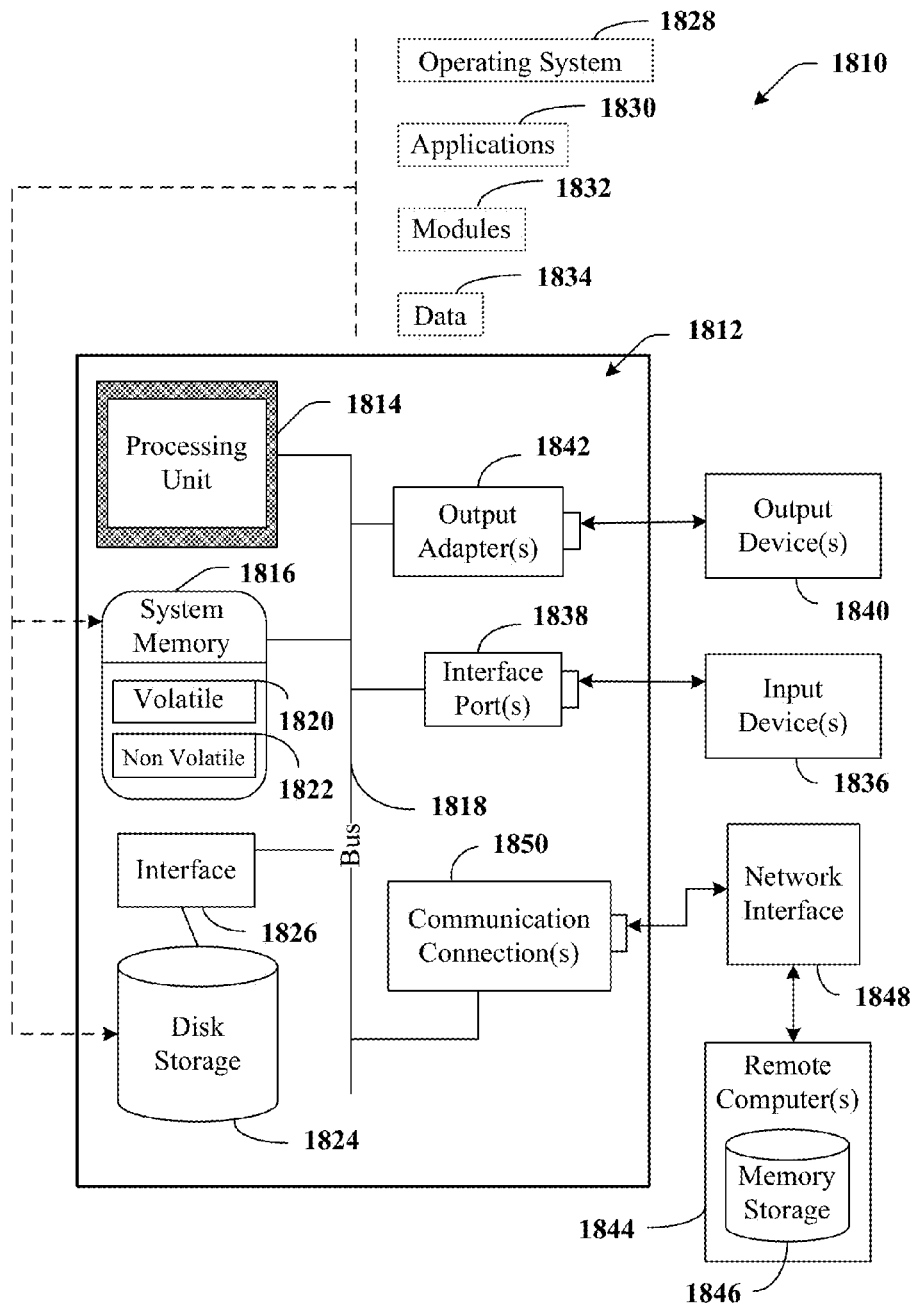
FIG. 18 is an example computing environment.
Figure 19:
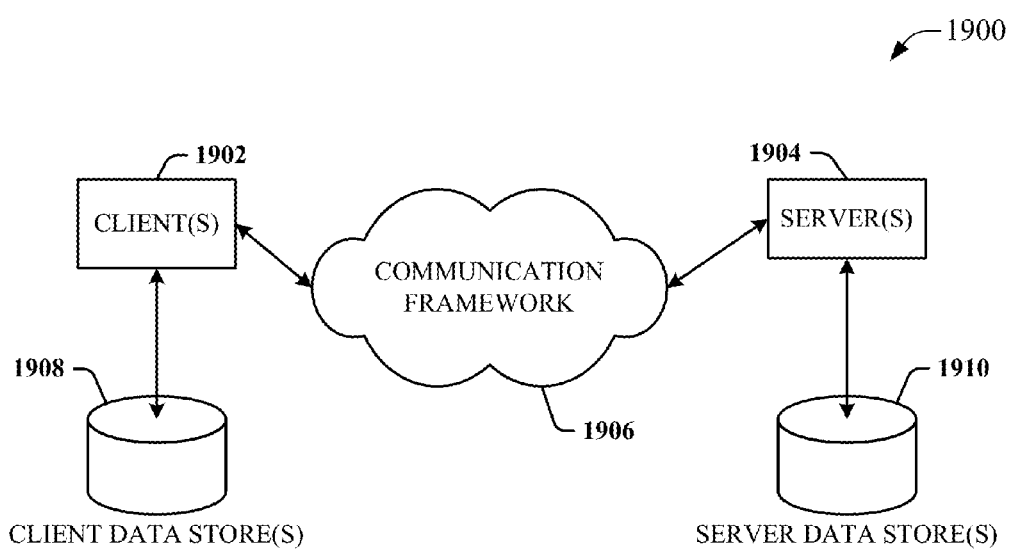
FIG. 19 is an example networking environment.

In order to provide a context for the various aspects of the disclosed subject matter, FIGS. 18 and 19 as well as the following discussion are intended to provide a brief, general description of a suitable environment in which the various aspects of the disclosed subject matter may be implemented.

With reference to FIG. 18, an example environment 1810 for implementing various aspects of the aforementioned subject matter includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Multi-core microprocessors and other multiprocessor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable PROM (EEPROM), or flash memory.

Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/nonvolatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer 1812. System applications 1830 take advantage of the management of resources by operating system 1828 through program modules 1832 and program data 1834 stored either in system memory 1816 or on disk storage 1824. It is to be appreciated that one or more embodiments of the subject disclosure can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapters 1842 are provided to illustrate that there are some output devices 1840 like monitors, speakers, and printers, among other output devices 1840, which require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the system bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

FIG. 19 is a schematic block diagram of a sample computing environment 1900 with which the disclosed subject matter can interact. The sample computing environment 1900 includes one or more client(s) 1902. The client(s) 1902 can be hardware and/or software (e.g., threads, processes, computing devices). The sample computing environment 1900 also includes one or more server(s) 1904. The server(s) 1904 can also be hardware and/or software (e.g., threads, processes, computing devices). The servers 1904 can house threads to perform transformations by employing one or more embodiments as described herein, for example. One possible communication between a client 1902 and servers 1904 can be in the form of a data packet adapted to be transmitted between two or more computer processes. The sample computing environment 1900 includes a communication framework 1906 that can be employed to facilitate communications between the client(s) 1902 and the server(s) 1904. The client(s) 1902 are operably connected to one or more client data store(s) 1908 that can be employed to store information local to the client(s) 1902. Similarly, the server(s) 1904 are operably connected to one or more server data store(s) 1910 that can be employed to store information local to the servers 1904.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. An apparatus, comprising:
   a network plug on a rear side of the apparatus and configured to plug into an Ethernet data port;
   a power-over-Ethernet (PoE) interface component configured to receive PoE power via the Ethernet data port;
   a conversion component configured to distinguish between types of the PoE power based on at least one of a detected voltage level of the PoE power or identification of at least one conductor of the network plug on which the PoE power is received, and to convert the PoE power to universal serial bus (USB) charging power based on a determined type of the PoE power;
   a USB charging port disposed on a front side of the apparatus and configured to output the USB charging power; and
   a retaining latch configured to latch the apparatus within a window of a wall plate.

2. The apparatus of claim 1, wherein the USB charging port is connected to the network plug via a USB cable.

3. The apparatus of claim 1, further comprising at least one status indicator configured to indicate at least one status of the apparatus.

4. The apparatus of claim 1, wherein the PoE interface component comprises a set of terminals configured to connect to a respective set of conductors of an Ethernet cable.

5. The apparatus of claim 1, wherein the conversion component is further configured to format USB data received via the USB charging port to an Ethernet protocol.

6. The apparatus of claim 5, wherein the Ethernet protocol comprises transmission control protocol/Internet protocol (TCP/IP).

7. The apparatus of claim 1, wherein the conversion component is further configured to format Ethernet data received via the PoE interface component to a USB protocol.

8. The apparatus of claim 1, further comprising a data port, wherein the apparatus is configured to pass data between the data port and the PoE interface component.

9. The apparatus of claim 1, wherein the PoE power is received via an HDBaseT link provided over a category cable.

10. The apparatus of claim 1, further comprising one or more audio output jacks configured to output audio data received via the Ethernet data port.

11. An apparatus, comprising:
    an Ethernet plug configured to interface with an Ethernet data port;
    a wireless transceiver configured to create a wireless network that facilitates wireless data exchange with the Ethernet data port;
    a power adapter configured to leverage power-over-Ethernet (PoE) power carried by the Ethernet data port to power the wireless transceiver; and
    an audio output jack configured to output an audio signal received by the wireless transceiver from an audio source device via the wireless network.

12. A receiver module, comprising:
    a universal serial bus (USB) port on a front face of the receiver module;
    a conversion component configured to convert power-over-HDBaseT (PoH) received via an HDBaseT link to USB power and deliver the USB power to the USB port;
    an Ethernet port on the front face of the receiver module and configured to exchange Ethernet signals with the HDBaseT link; and
    a high-definition multimedia interface (HDMI) port on the front face of the receiver module and configured to exchange audio and video signals with the HDBaseT link.

13. The apparatus of claim 3, wherein the at least one status comprises at least one of presence of the PoE power at the network plug, identification of the determined type of the PoE power, or a charging status of a USB device connected to the USB charging port.

14. The apparatus of claim 1, wherein the types of the PoE power comprise at least Institute of Electrical and Electronic Engineers (IEEE) 802.3af, IEEE 802.3at Mode 1, and IEEE 802.3at Mode 2.

15. The apparatus of claim 11, wherein the Ethernet plug is located on a rear surface of the apparatus, and the one or more audio output jacks are located on a side surface adjacent to the rear surface.

16. The apparatus of claim 11, wherein the Ethernet plug is located on a rear surface of the apparatus, and the one or more audio output jacks are located on a front surface of the apparatus.

17. The apparatus of claim 11, wherein the Ethernet data port comprises a first Ethernet data port, and the apparatus further comprises a second Ethernet data port configured to exchange data with the first Ethernet data port while the Ethernet plug is interfaced with the first Ethernet data port.

18. The receiver module of claim 12, wherein the USB port is configured to at least one of exchange control signaling with the HDBaseT link or exchange Ethernet data signals with the HDBaseT link.

19. The receiver module of claim 12, further comprising a port configured to receive a category cable connector, wherein the HDBaseT link is received via the port.

20. The receiver module of claim 12, further comprising a power supply configured to generate PoH power and supply the PoH power to the HDBaseT link.

* * * * *